US010612957B2

(12) United States Patent
Kaufmann et al.

(10) Patent No.: US 10,612,957 B2
(45) Date of Patent: Apr. 7, 2020

(54) SENSOR SYSTEM FOR DETERMINING AT LEAST ONE PARAMETER OF A FLUID MEDIUM FLOWING THROUGH A CHANNEL

(71) Applicant: Robert Bosch GmbH, Stuttgart (DE)

(72) Inventors: Andreas Kaufmann, Sontheim an der Brenz (DE); Hans Beyrich, Freiberg/N. (DE); Torsten Mais, Ludwigsburg (DE); Ulrich Wagner, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/119,183

(22) PCT Filed: Dec. 22, 2014

(86) PCT No.: PCT/EP2014/078978
§ 371 (c)(1),
(2) Date: Aug. 16, 2016

(87) PCT Pub. No.: WO2015/120936
PCT Pub. Date: Aug. 20, 2015

(65) Prior Publication Data
US 2017/0010140 A1 Jan. 12, 2017

(30) Foreign Application Priority Data
Feb. 17, 2014 (DE) .......................... 10 2014 202 853

(51) Int. Cl.
*G01F 15/14* (2006.01)
*G01F 1/684* (2006.01)
*G01F 1/692* (2006.01)
(52) U.S. Cl.
CPC .............. *G01F 15/14* (2013.01); *G01F 1/684* (2013.01); *G01F 1/692* (2013.01)

(58) Field of Classification Search
CPC ...... G01F 1/6842; G01F 1/6845; G01F 1/692; H05K 5/0013
See application file for complete search history.

(56) References Cited

U.S. PATENT DOCUMENTS 5,404,712 A    4/1995  Few et al.
6,012,432 A *  1/2000  Igarashi ............... F02D 41/187
                                                        123/494

(Continued)

FOREIGN PATENT DOCUMENTS

CN    1386190 A    12/2002
CN  102918366 A     2/2013

(Continued)

OTHER PUBLICATIONS

International Search Report for PCT/EP2014/078978, dated Mar. 27, 2015.

*Primary Examiner* — Randy W Gibson
*Assistant Examiner* — Gedeon M Kidanu
(74) *Attorney, Agent, or Firm* — Norton Rose Fulbright US LLP; Gerard Messina

(57) ABSTRACT

A sensor system for determining at least one parameter of a fluid medium flowing through a channel, in particular of an intake air mass flow of an internal combustion engine. The sensor system includes a sensor housing, in particular a plug-in sensor, which is introduced or introducible into a flow tube in which the channel is formed, and at least one sensor chip, which is situated in the channel for determining the parameter of the fluid medium. The sensor housing includes a housing body and a cover. The channel has an inlet into the channel, which faces in a direction opposite the main flow direction of the fluid medium, and at least one outlet out of the channel. The channel is formed in the cover, and the cover is connected to the housing body with the aid of a force-locked connection.

12 Claims, 4 Drawing Sheets

(56) References Cited

U.S. PATENT DOCUMENTS

| | | | |
|---|---|---|---|
| 6,111,760 A * | 8/2000 | Nixon | H05K 5/0013 220/4.02 |
| 6,591,674 B2 | 7/2003 | Gehman et al. | |
| 6,752,015 B2 | 6/2004 | Thompson et al. | |
| 6,938,491 B2 * | 9/2005 | Clark | G01L 23/10 73/753 |
| 8,701,475 B2 * | 4/2014 | Kohno | G01F 1/684 73/114.33 |
| 2002/0078744 A1 | 6/2002 | Gehman et al. | |
| 2003/0037610 A1 * | 2/2003 | Roeckel | G01F 1/6842 73/204.22 |
| 2004/0055376 A1 | 3/2004 | Thompson et al. | |
| 2006/0201720 A1 * | 9/2006 | Williamson | G01G 19/44 177/238 |
| 2008/0163683 A1 * | 7/2008 | Becke | G01F 1/684 73/431 |
| 2008/0184769 A1 * | 8/2008 | McKinney | G01F 1/684 73/1.16 |
| 2009/0126477 A1 * | 5/2009 | Saito | G01F 1/6845 73/204.25 |
| 2009/0211355 A1 * | 8/2009 | Renninger | F02D 41/187 73/204.26 |
| 2010/0064799 A1 * | 3/2010 | Mais | G01F 1/6842 73/204.11 |
| 2010/0180675 A1 * | 7/2010 | Schneider | G01F 1/6845 73/114.31 |
| 2011/0259097 A1 * | 10/2011 | Mais | G01D 11/245 73/204.25 |
| 2012/0048005 A1 * | 3/2012 | Renninger | G01F 1/6842 73/114.32 |
| 2013/0061684 A1 * | 3/2013 | Frauenholz | G01F 1/6842 73/861 |
| 2014/0041612 A1 | 2/2014 | Furutani et al. | |
| 2014/0060176 A1 | 3/2014 | Mais et al. | |

FOREIGN PATENT DOCUMENTS

| | | |
|---|---|---|
| CN | 103175583 A | 6/2013 |
| DE | 10 2011 005 768 A1 | 9/2012 |
| JP | H08-505676 A | 6/1996 |
| JP | 2006-144618 A | 6/2006 |
| JP | 2006-242035 A | 9/2006 |
| JP | 2010-121482 A | 6/2010 |
| JP | 2010-138818 A | 6/2010 |
| WO | 2012/137384 A1 | 10/2012 |

* cited by examiner

SENSOR SYSTEM FOR DETERMINING AT LEAST ONE PARAMETER OF A FLUID MEDIUM FLOWING THROUGH A CHANNEL

FIELD OF THE INVENTION

The present invention relates to a sensor system for determining at least one parameter of a fluid medium flowing through a channel, in particular of an intake air mass flow of an internal combustion engine.

BACKGROUND INFORMATION

Numerous methods and devices for determining at least one flow property of fluid media, i.e., liquids and/or gases, are known from the related art. The flow properties as possible parameters may be arbitrary measurable physical and/or chemical properties, which qualify or quantify a flow of the fluid medium. This may be a flow rate and/or a mass flow and/or a volume flow in particular.

The present invention is described below in particular with reference to so-called hot-film mass air flow sensors, such as those known from Konrad Reif (ed.): *Sensoren im Kraftfahrzeug* [Sensors in the Automobile], 1$^{st}$ edition, 2010, pages 146-148. Such hot-film mass air flow sensors are generally based on a sensor chip, in particular a silicon sensor chip, for example, including a sensor membrane as the measuring surface or a sensor area over which the flowing fluid medium may flow. The sensor chip generally includes at least one heating element and at least two temperature sensors situated on the measuring surface of the sensor chip, for example, the one temperature sensor being situated upstream from the heating element and the other temperature sensor being situated downstream from the heating element. A mass flow and/or volume flow of the fluid medium may be inferred from an asymmetry of the temperature profile detected by the temperature sensors.

Hot-film mass air flow sensors are usually configured as plug-in sensors, which are insertable permanently or replaceably into a flow tube. For example, this flow tube may be an intake tract of an internal combustion engine.

A substream of the medium flows through at least one main channel provided in the hot-film mass air flow sensor. A bypass channel is formed between the inlet and the outlet of the main channel. In particular, the bypass channel is configured in such a way that it has a curved section for deflecting the substream of the medium entering through the inlet of the main channel, the curved section merges in the further course into a section in which the sensor chip is situated. The section mentioned last is the actual measuring channel, in which the sensor chip is situated.

Such hot-film mass air flow sensors must in practice meet numerous requirements. In addition to the objective of reducing the pressure drop on the hot-film mass air flow sensor on the whole through suitable fluidic designs, one of the main challenges is to further improve the signal quality and the robustness of the devices with respect to contamination by oil and water droplets as well as soot, dust and other solid particles. This signal quality relates to a mass flow of the medium through the measuring channel leading to the sensor chip, for example, and optionally also relates to a reduction of a signal drift and an improvement in the signal-to-noise ratio. The signal drift relates to the deviation in mass flow of the medium, for example, in the sense of a change in the characteristic line relationship between the mass flow actually occurring and the signal to be output, which is ascertained within the scope of the calibration during the manufacture. During the ascertainment of the signal-to-noise ratio, the sensor signals output in rapid chronological sequence are taken into account, whereas the characteristic line drift or the signal drift relates to a change in the average.

In the case of traditional hot-film mass air flow sensors of the type described here, a sensor carrier including a sensor chip mounted thereon or introduced therein generally protrudes into the measuring channel. For example, the sensor chip may be glued onto or into the sensor carrier. The sensor carrier may form a unit together with a bottom plate made of metal, on which an electronic system, a control circuit and evaluation circuit (for example, including a circuit carrier, in particular a circuit board) may be glued. For example, the sensor carrier may be configured as an injection-molded plastic part of an electronic module. The sensor chip and the control circuit and evaluation circuit may be interconnected by bond connections, for example. The electronic module created in this way may be glued into a sensor housing, for example, and the entire plug-in sensor may then be closed with covers.

Patent document DE 10 2011 005 768 A1 discusses a device for detecting at least one property of a fluid medium including at least one sensor housing which is introducible into the fluid medium. The sensor housing has at least one channel through which the fluid medium may flow and which has at least one outlet opening. The fluid medium may flow out through the outlet opening after flowing through the channel. The sensor housing has at least one housing body and at least one cover. The outlet opening is situated in the cover. The housing body has at least one collar section engaging in the outlet opening and forming at least a section of an edge of the outlet opening.

Despite the numerous advantages of the devices known from the related art, they still retain potential for improvement with respect to functional aspects. Thus such devices usually have an electronic module which is accommodated in an electronics space of the sensor housing. The electronic module, the remaining area of the sensor housing, in which the channel is formed, and the cover are constructed in such a way that the one part of the sensor carrier including the sensor chip is accommodated in the area of the channel around which the flow circulates. The other part including the electronics is situated in the electronics space of the sensor housing so that it is protected from external effects. The areas are separated by an adhesive tape on the cover, which is located above the center of the sensor chip. The fit of the cover and the housing body of the sensor housing is sometimes not unambiguously defined. The actual dimensions of the cover and of the housing body vary since the cover and the housing body usually originate from injection molding tools having multiple cavities. Consequently, the resulting position of the cover relative to the housing body is subject to fluctuations. The position tolerances of the cover in turn result in a variance in the characteristic line behavior, which must be compensated for in the equalizing process.

SUMMARY OF THE INVENTION

A sensor system for determining at least one parameter of a fluid medium flowing through a channel is therefore provided, which makes it possible to at least largely prevent the disadvantages of known methods and strategies, and thereby ensuring a position of the channel, which is predefined to be exactly the same, with respect to the housing body and in particular with respect to the position of the sensor chip.

The sensor system for determining at least one parameter of a fluid medium flowing through a channel, in particular of an intake air mass flow of an internal combustion engine, includes a sensor housing, in particular a plug-in sensor, which is introduced or introducible into a flow tube in which the channel is formed, and includes at least one sensor chip situated in the channel for determining the parameter of the fluid medium, the sensor housing including a housing body and a cover. The channel has an inlet into the channel, which faces in the direction opposite the main flow direction of the fluid medium and at least one outlet out of the channel. The channel is formed in the cover and the cover is connected to the housing body via a force-locked connection.

The force-locked connection may be a press fit, for example. The cover may have a receptacle. The housing body may have a protrusion. The protrusion may engage in the receptacle to form the force-locked connection. The protrusion may protrude away from the housing body in a first direction of extension. The protrusion may have a triangular cross-sectional area with a cross section viewed perpendicular to the first direction of extension. The cover may have at least one support surface on the cover side. The housing body may have at least one support surface on the housing body side. The support surface on the cover side and the support surface on the housing body side may come in contact with one another. A first distance from the protrusion to the support surface on the housing body side may be smaller than a second distance from the receptacle to the support surface on the cover side. The cover may have at least three support surfaces on the cover side. The housing body may have at least three support surfaces on the housing body side. A support surface on the cover side may contact a support surface on the housing body side. This creates a three-point support. Plastic deformation of the protrusion may occur in the receptacle. The protrusion may protrude essentially perpendicularly away from the housing body. The housing body may additionally have an electronics space. The sensor chip may be situated on a sensor carrier which extends from the electronics space into the channel in a second direction of extension. The protrusion may be situated opposite the electronics space with the channel in between in the direction of extension. The protrusion may extend perpendicular to the direction of extension.

Within the scope of the present invention, the main flow direction is to be understood as the local flow direction of the fluid medium at the site of the sensor or the sensor system, whereby local irregularities such as turbulences, for example, may be disregarded. In particular, the main flow direction may thus be understood to be the average local direction of conveyance of the flowing fluid medium at the site of the sensor system. The average direction of conveyance refers to a direction of conveyance, in which most of the fluid medium flows when averaged over time.

Within the scope of the present invention, a housing body and a cover are to be understood as at least two components of the sensor housing which cooperate and are in direct contact, for example. According to the present invention, it is provided that a force-locked contact be provided between them. In addition, a form-fitting and/or an integral connection is/are also possible.

Within the scope of the present invention, a force-locked connection is to be understood as a connection in which a normal force acts on the surfaces to be joined to one another. A mutual displacement of the surfaces to be joined is prevented as long as the counterforce induced by the adhesive friction is not exceeded. The force-locked connection or the friction-locked connection is lost and the surfaces slide on one another when the load force acting tangentially is greater than the adhesive friction force, such as, for example, between a wheel and a rail or road surface in the case of vehicles with their own drive. Accordingly, force-locked connections within the scope of the present invention are connections in which the adhesive friction counteracting a force for displacement of the components to be joined relative to one another is greater than the force for displacement. The force-locked connection may be a press fit in particular but not exclusively.

Within the scope of the present invention, a press fit is to be understood as a fit in which the component manufactured from the connecting partners has an oversize dimension. The term "fit" refers to the dimensional relationship between two paired parts, which are subject to tolerances, the two parts having the same nominal dimension, but the position and size of the tolerance fields may be different. A fit always indicates a tolerance, in which the actual dimensions of the receptacle, such as a borehole and a part to be introduced into it, such as a journal or a dome, may move. In any case, the maximum size of the receptacle is smaller than the minimum size of the part to be introduced into it.

The housing body and the cover may each be configured in one piece or in several pieces. A cover is to be understood in general as a part of the sensor housing, which forms a surface around the outlet opening, facing the fluid medium outside of the sensor housing. However, the housing body is a component situated in the area of the outlet opening on the side of the sensor housing opposite this surface. According to the present invention, it is provided that the at least one channel be formed in the cover. The housing body and/or the cover may be manufactured entirely or partially from a plastic material, but alternatively or additionally, it is also possible to use other materials, for example, ceramic and/or metallic materials. The housing body and the cover, for example, may be part of a plug-in sensor.

The outlet opening may basically have an arbitrary cross section, for example, a round, oval, polygonal or slot-shaped cross section. The outlet opening may be situated on a side surface of the plug-in sensor, which is situated in the flow tube in such a way that it may be aligned essentially in parallel to a main flow direction, i.e., which may have a deviation of no more than 20°, in particular no more than 10° and particularly no more than 50° from a parallel alignment with the main flow direction.

Other possible embodiments relate to the channel of the sensor system. This channel may be configured in one piece or in several pieces. In particular, at least one sensor element for detecting the at least one parameter may be accommodated in the channel. This sensor element may be in particular a hot-film mass air flow sensor element, for example, a hot-film mass air flow sensor chip according to the above description. However, alternatively or additionally, other embodiments are also possible.

The channel may in particular have at least one main channel and at least one bypass channel branching off from the main channel. The sensor element may be situated in the at least one optional bypass channel in particular. For example, the main channel may extend from a frontal, upstream inlet opening to the outlet opening. The bypass channel may branch off from the main channel and open into one or multiple bypass channel outlet openings, which may also be situated on a side surface of the plug-in sensor and/or on a head side, for example, protruding the farthest into the flowing fluid medium. However, other embodiments are also possible.

The cover may have an outside facing the fluid medium in particular. This outside may face the fluid medium, for example, outside of the sensor housing, in particular in the flow tube, and the fluid medium may circulate in the flow tube, for example. The channel, for example, the main channel, may be configured on the outlet opening in such a way that the fluid medium flowing out of the outlet opening flows at an acute angle into the fluid medium flowing outside of the sensor housing with the main flow direction.

The cover and the housing body may have support surfaces, which prevent movement of these parts relative to one another. Within the scope of the present invention, a support surface is to be understood as a surface of a first part, such as the cover, for example, up to which a second part, such as the housing body, for example, may be moved relative to the first part.

A basic idea of the present invention is to design the channel in the cover. The cover shaped in this way not only has the task of sealing off the housing but also assumes the management of the air flow. To ensure always the same position of the channel with respect to the housing body and in particular with respect to the position of the sensor chip, the cover must already be brought into its final position when placed in the housing body, and this must not change after settling, in any way due to twisting or bursting open, for example.

The cover is always positioned in the same position in the housing body. The clamping dome exerts a pressure due to the force-locked connection between the cover and the housing body which is implemented, for example, by a protrusion in the form of a clamping dome, which engages in a receptacle. Due to this pressure, the cover is pressed against the coordinated support surfaces in the housing body and therefore cannot be shifted any longer. The positional tolerances of the cover, which inevitably occur during the manufacturing process, are therefore now being minimized, and the sensor may be produced with a characteristic line having a narrower tolerance at the same manufacturing yield. Due to the special function surfaces, an effective implementation of narrow positional tolerances is made possible, even in the event of combinations of covers and housing bodies from various mold cavities. Since the function surfaces are limited to very small areas, they may be corrected with little effort until the desired fit is achieved.

Additional optional details and features of the present invention are derived from the following description of exemplary embodiments, which are schematically depicted in the figures.

DETAILED DESCRIPTION

Figure 1:
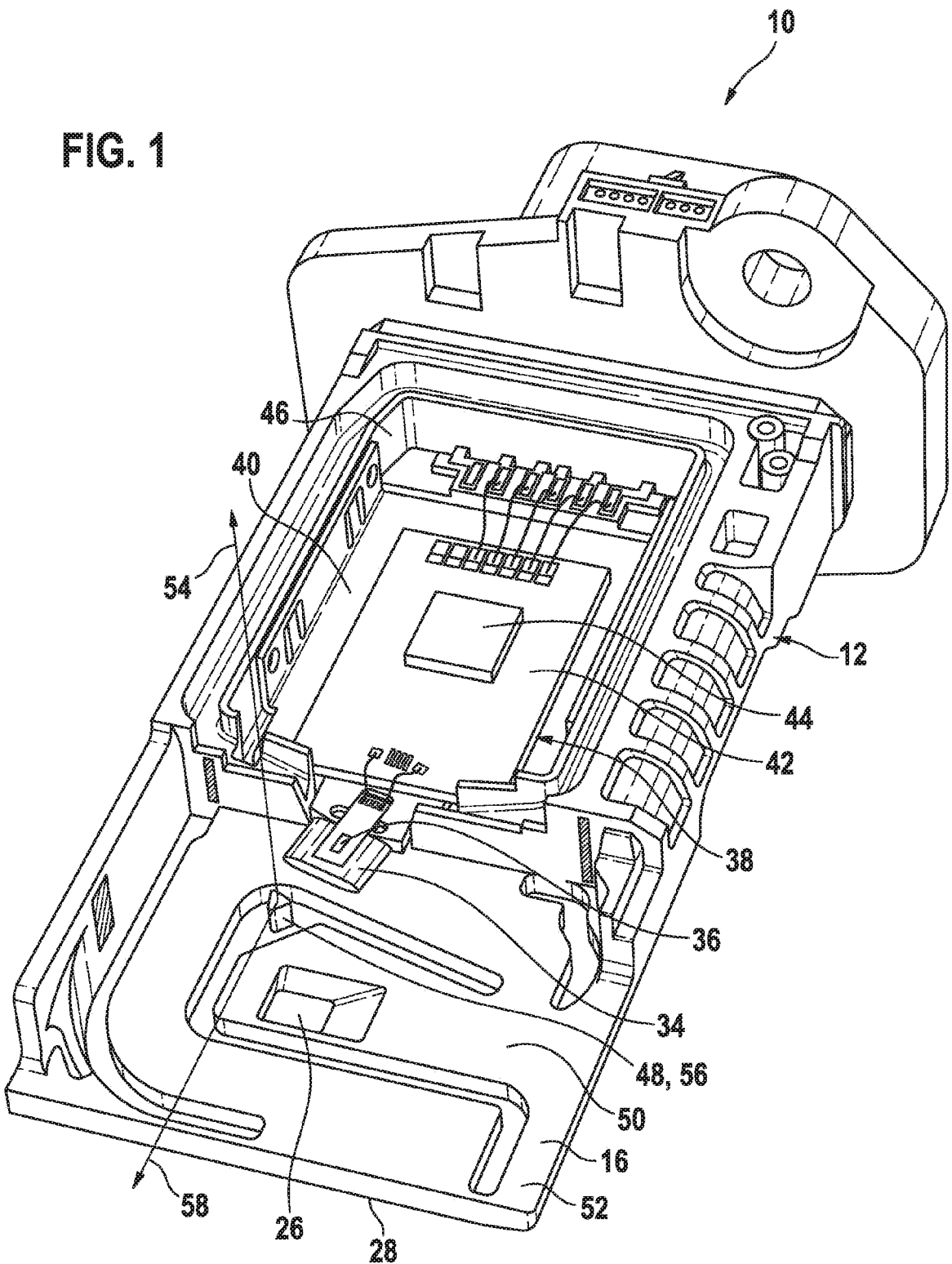
FIG. 1 shows a perspective representation of a sensor system in an unlocked state.

FIG. 1 shows a sensor system 10 for determining a parameter of a fluid medium flowing through a channel. Sensor system 10 in this exemplary embodiment is configured as a hot-film mass air flow sensor and is able to detect an intake air mass flow of an internal combustion engine in particular. In this exemplary embodiment, sensor system 10 includes a sensor housing 12. Sensor housing 12 is configured as a plug-in sensor, which may be plugged into a flow tube, in particular an intake tract of the internal combustion engine. A channel structure 14 is formed in sensor housing 12, as explained in greater detail below. Sensor housing 12 includes a housing body 16 and a cover 18.

Figure 2:
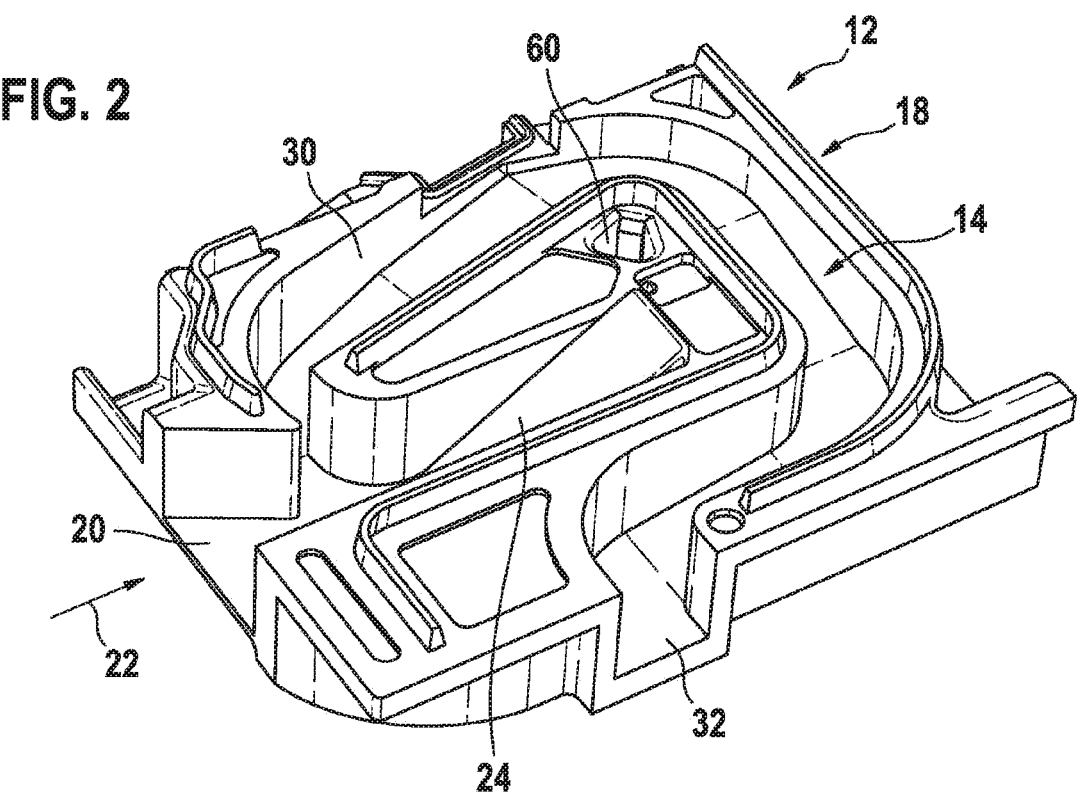
FIG. 2 shows a perspective representation of a cover of the sensor system.

FIG. 2 shows a perspective representation of cover 18. Channel structure 14 is formed in cover 18. Through channel structure 14, a representative amount of fluid medium may flow through an inlet opening, i.e., an inlet 20 facing in the opposite direction from a main flow direction 22 of the fluid medium after being inserted. Channel structure 14 has a main channel 24, which opens into a main channel outlet 26 on an underside 28 of sensor housing 12, more specifically of housing body 16, based on the representation in FIG. 1, as well as a bypass channel or measuring channel 30, which branches off from main channel 24 and opens into a measuring channel outlet 32 of measuring channel 30.

Figure 3:
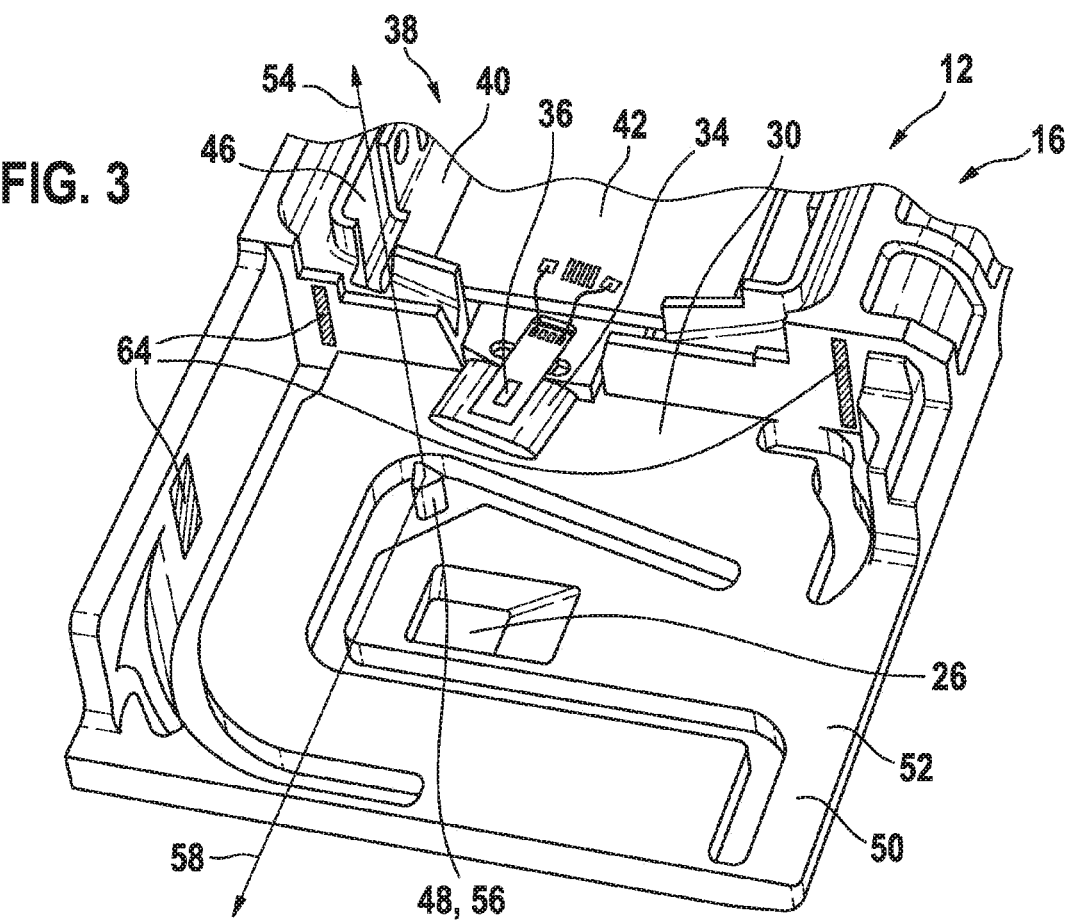
FIG. 3 shows an enlarged perspective representation of a housing body of the sensor system.

FIG. 3 shows an enlarged perspective representation of housing body 16. As in the case of traditional air flow sensors, a sensor carrier 34 in the form of a wing protrudes into measuring channel 30. A sensor chip 36 is inserted into this sensor carrier 34 in such a way that the fluid medium flows over a sensor membrane, which is configured as a sensor area of sensor chip 36. Together with sensor chip 36, sensor carrier 34 is a component of an electronic module 38, which has a curved bottom plate 40 and a circuit board 42 mounted thereon, for example, by adhesive bonding, including a control circuit or evaluation circuit 44. Sensor carrier 34 may be injection molded as a plastic part on bottom plate 40, for example. Sensor carrier 34, which is an injection-molded part injection-molded onto bottom plate 40, for example, and then may be configured to be integral with bottom plate 40 of circuit board 42, is provided with a leading edge, which may be configured to be rounded.

Sensor chip 36 is electrically connected to control circuit and evaluation circuit 44 via electrical connections, which may be configured as wire bonds. Electronic module 38 created in this way is introduced into an electronics space 46 of sensor housing 12, more specifically of housing body 16, e.g., by gluing. This may be accomplished in such a way that sensor carrier 34 protrudes into channel structure 14, as shown in FIGS. 1 and 3. Electronics space 46 is then closed by an electronics space cover (not shown in detail).

As shown in FIG. 3, housing body 16 has a protrusion 48. Protrusion 48 is situated in a cover receiving section 50 of housing body 16. Cover receiving section 50 is configured to receive cover 18. In other words, cover receiving section 50 is the section of housing body 16 in which cover 18 is mounted to form sensor housing 12. Cover receiving section 50 is situated in a front area 52 of housing body 16, i.e., the area of housing body 16, which is situated in the fluid medium. Protrusion 48 protrudes in a first direction of extension 54 away from housing body 16 in cover receiving section 50. In a cross section viewed perpendicular to the first direction of extension 54, protrusion 48 has a triangular cross-sectional area. For example, protrusion 48 is configured as a dome 56. Protrusion 48 protrudes perpendicularly away from housing body 16 in particular. In a condition in which cover 18 is mounted on housing body 16, protrusion 48 is situated opposite electronics space 46 in particular, measuring channel 30 being between them in a second direction of extension 58, in which sensor carrier 34 extends into measuring channel 30. Protrusion 48 extends perpendicular to second direction of extension 58.

FIG. 3 shows a perspective view of cover 18, in which channel structure 14 is formed. Cover 18 has a receptacle 60 for protrusion 48. To form sensor housing 12, cover 18 is connected to housing body 16 by a force-locked connection, as explained in greater detail below. This force-locked connection may be a press fit, for example. Protrusion 48 engages in recess 60 to form the force-locked connection.

Figure 4:
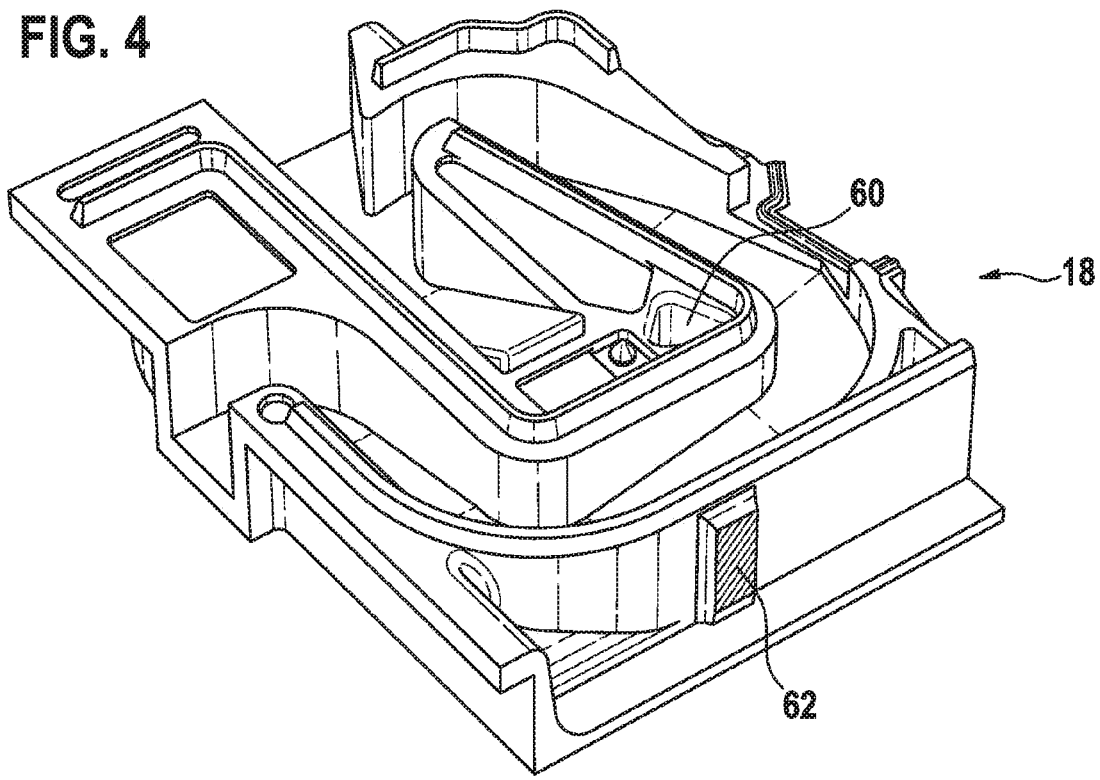
FIG. 4 shows another perspective representation of the cover.
Figure 5:
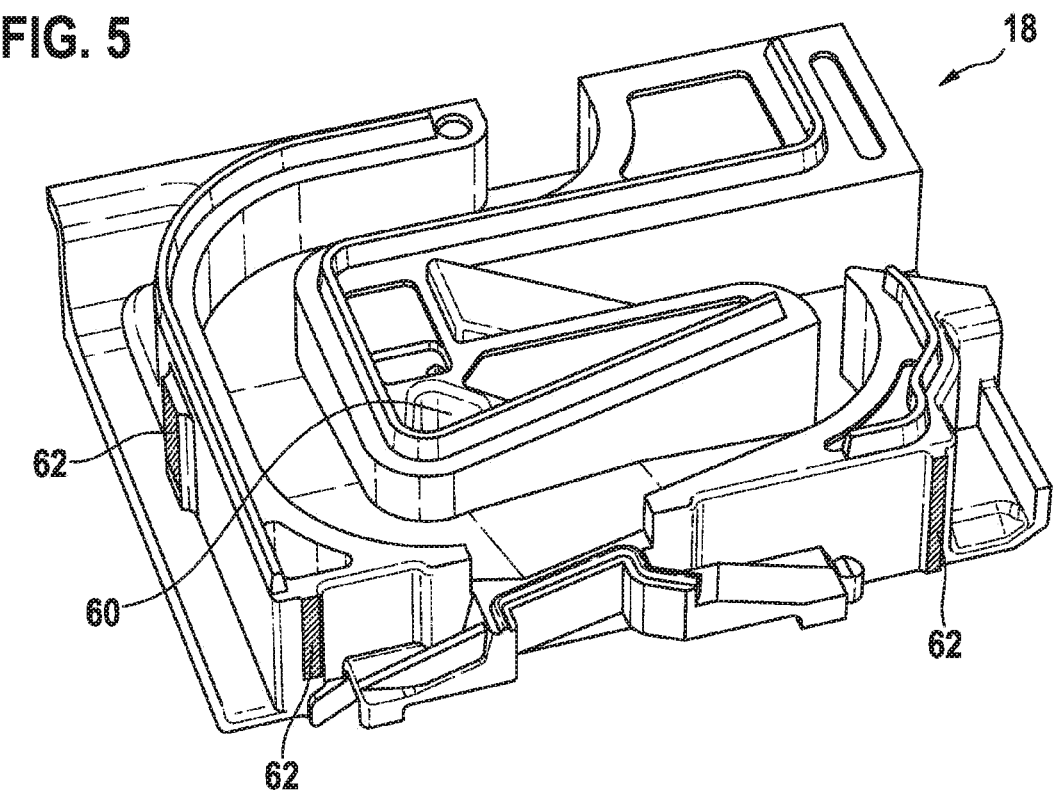
FIG. 5 shows another perspective view of the cover.

FIG. 4 shows a perspective view of cover 18 from a downstream side. FIG. 5 shows yet another perspective view of cover 18 from the side facing electronics space 46. Cover 18 has at least one support surface 62 on the cover side. Cover 18, for example, has at least three support surfaces 62 on the cover side. Housing body 16 has at least one support surface 64 on the housing body side. For example, housing body 16 has three support surfaces 64 on the housing body side. In an installed state, support surfaces 62 on the cover side contact support surfaces 64 on the housing body side. A distance from protrusion 48 to support surface 64 on the housing body side is smaller than a second distance from receptacle 60 to support surface 62 on the cover side. A press fit is therefore achieved, holding cover 18 in its position on housing body 16. The difference in dimensions results in the tip of protrusion 48 being hooked into the opposing surface of receptacle 60 on cover 18, so that cover 18 can no longer be twisted. Even after reaching the position, it cannot recoil or shift, as explained in greater detail below.

Figure 6:
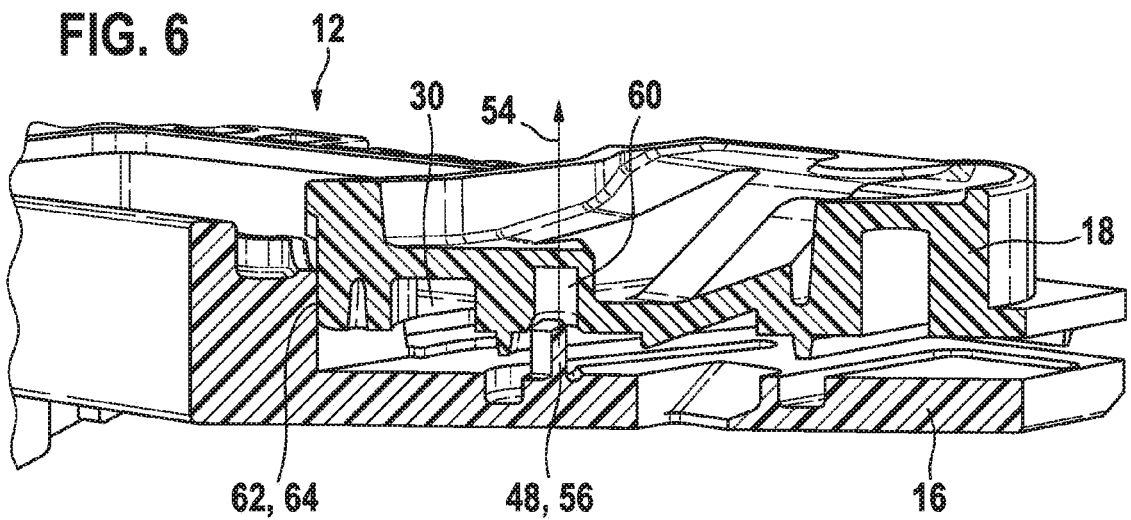
FIG. 6 shows a sectional view of the sensor housing at the start of an assembly process.
Figure 7:
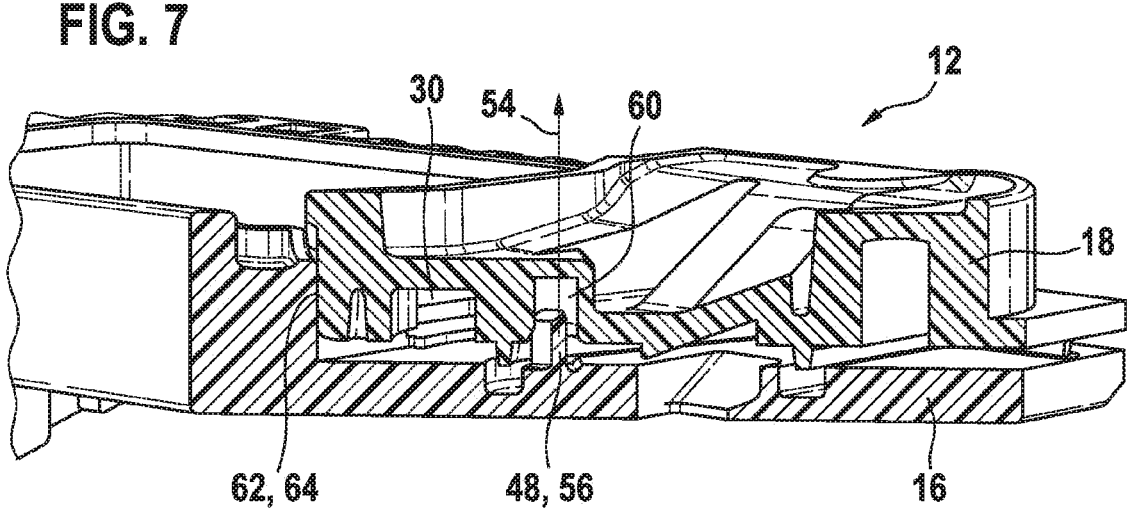
FIG. 7 shows a sectional view of the sensor housing in an intermediate step in the assembly process.
Figure 8:
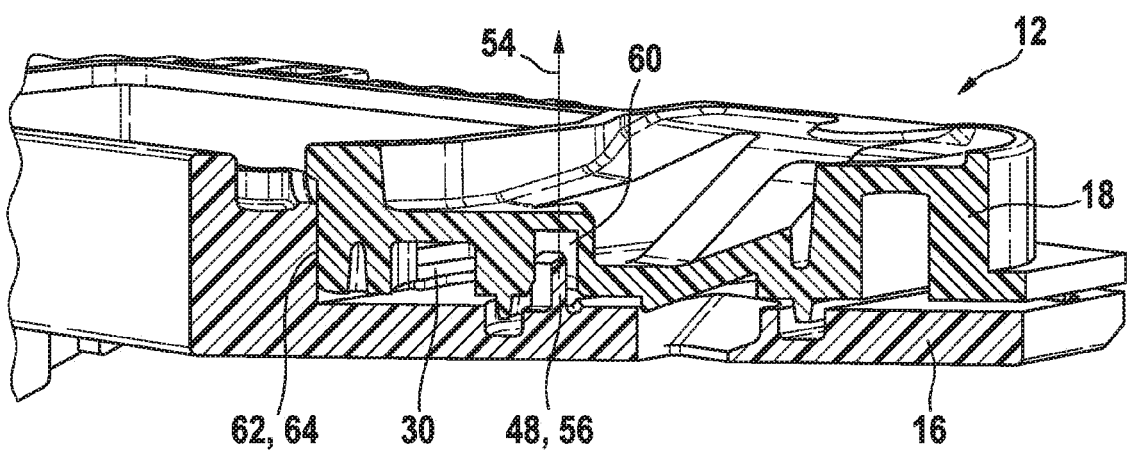
FIG. 8 shows a sectional view of the sensor housing in a final step of the assembly process.

The various method steps of the assembly process for manufacturing sensor system 10 or assembling cover 18 on housing body 16 are described below with reference to FIGS. 6 through 8. FIG. 6 shows a sectional view of sensor housing 12 at the start of the assembly process. FIG. 7 shows a sectional view of sensor housing 12 in an intermediate step of the assembly process. FIG. 8 shows a sectional view of sensor housing 12 in a final step of the assembly process and the final position of cover 18 on housing body 16.

As shown in FIG. 6, the cover 18 is placed loosely on housing body 16 at the start, whereby support surfaces 62 and 64 contact one another. Thereupon, cover 18 is pushed further in the direction of housing body 16. This pushing takes place in parallel with the first direction of extension 54, in which protrusion 48 extends. As shown in FIG. 7, protrusion 48 thereby locks onto receptacle 60. As shown in FIG. 8, cover 18 is ultimately pushed further in the direction of housing body 16. In the process, protrusion 48 is pushed deeply into receptacle 60 and moves cover 18 into its lateral positions and engages in cover 18 by pinching the tip of protrusion 48, i.e., protrusion 48 undergoes plastic deformation in receptacle 60. Protrusion 48 takes over the guidance of cover 18 onto housing body 16 during assembly and presses cover 18 onto the surfaces provided for this. A three-point support is created by three support surfaces 62 and 64, so that cover 18 is no longer able to rotate about the first direction of extension 54 in relation to housing body 16. In the final position, cover 18 also cannot recoil or shift.

What is claimed is:

1. A sensor system for determining at least one parameter of a fluid medium flowing through a channel, in particular of an intake air mass flow of an internal combustion engine, comprising:
   a sensor housing which is introduced or introducible into a flow tube, in which the channel is formed; and
   at least one sensor chip situated in the channel for determining the parameter of the fluid medium;
   wherein the sensor housing includes a housing body and a cover,
   wherein the channel includes an inlet into the channel, which faces in the opposite direction from a main flow direction of the fluid medium, and at least one outlet out of the channel, and
   wherein the channel is formed in the cover, wherein the fluid medium is configured to flow through the channel formed in the cover, and the cover is connected to the housing body with the aid of a force-locked connection.

2. The sensor system of claim 1, wherein the force-locked connection is a press fit.

3. The sensor system of claim 1, wherein the protrusion protrudes away from the housing body in a first direction of extension, the protrusion having a triangular cross-sectional area with a cross section viewed perpendicular to the first direction of extension.

4. The sensor system of claim 1, wherein the at least one parameter of the fluid medium flowing through the channel includes an intake air mass flow of an internal combustion engine.

5. The sensor system of claim 1, wherein the sensor housing includes a plug-in sensor.

6. The sensor system of claim 1, wherein the cover has a receptacle, and wherein the housing body has a protrusion, the protrusion engaging in the receptacle to form the force-locked connection.

7. The sensor system of claim 6, wherein the protrusion undergoes plastic deformation in the receptacle.

8. The sensor system of claim 6, wherein the protrusion protrudes essentially perpendicularly away from the housing body.

9. The sensor system of claim 6, wherein the cover has at least one support surface on the cover side, the housing body having at least one support surface on the housing body side, the support surface on the cover side and the support surface on the housing body side contacting one another, a first distance from the protrusion to the support surface on the housing body side being smaller than a second distance from the receptacle to the support surface on the cover side.

10. The sensor system of claim 9, wherein the cover has at least three support surfaces on the cover side, the housing body having at least three support surfaces on the housing body side, a support surface on the cover side contacting a support surface on the housing body side.

11. The sensor system of claim 6, wherein the sensor housing includes an electronics space, the sensor chip being situated on a sensor carrier, which extends outward from the electronics space into the channel in a second direction of extension, the protrusion being situated opposite the electronics space, the channel being between them in the second direction of extension.

12. The sensor system of claim 11, wherein the protrusion extends perpendicular to the second direction of extension.

* * * * *